(12) United States Patent
Larkin

(10) Patent No.: US 6,725,980 B2
(45) Date of Patent: Apr. 27, 2004

(54) APPARATUS AND METHOD FOR MOUNTING FRICTION ELEMENTS IN DISC BRAKES

(75) Inventor: James Anthony Larkin, Rugby (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/019,801

(22) PCT Filed: May 4, 2001

(86) PCT No.: PCT/GB01/01955
§ 371 (c)(1),
(2), (4) Date: Apr. 19, 2002

(87) PCT Pub. No.: WO01/86165
PCT Pub. Date: Nov. 15, 2001

(65) Prior Publication Data
US 2002/0134626 A1 Sep. 26, 2002

(30) Foreign Application Priority Data
May 5, 2000 (GB) .............................................. 0010807

(51) Int. Cl.$^7$ .............................................. F16D 55/22
(52) U.S. Cl. .................................. 188/72.3; 188/73.38
(58) Field of Search ............................ 188/73.38, 72.3, 188/73.37, 73.36, 73.35, 73.44, 73.45

(56) References Cited

U.S. PATENT DOCUMENTS

| | | | |
|---|---|---|---|
| 4,408,681 A | * 10/1983 | Oshima | 188/73.38 |
| 5,249,647 A | * 10/1993 | Kobayashi et al. | 188/72.3 |
| 5,251,727 A | 10/1993 | Loeffler et al. | |
| 5,310,024 A | * 5/1994 | Takagi | 188/72.3 |
| 6,179,095 B1 | * 1/2001 | Weiler et al. | 188/73.38 |
| 6,378,665 B1 | * 4/2002 | McCormick et al. | 188/72.3 |

FOREIGN PATENT DOCUMENTS

| | | |
|---|---|---|
| DE | 4332713 | 3/1995 |
| GB | 2158170 | 10/1985 |
| JP | 9-89018 | * 3/1997 |
| WO | 98/25804 | 12/1997 |
| WO | 98/26192 | 12/1997 |

* cited by examiner

*Primary Examiner*—Jack Lavinder
*Assistant Examiner*—Melanie Torres
(74) *Attorney, Agent, or Firm*—Michael D. Smith

(57) ABSTRACT

A spot-type automotive disc brake of floating-twin disc and fixed-caliper format utilizes one or more single wire springs to bias the two floating friction elements with respect to the fixed caliper. Each spring exerts a differential resilient effect on the central friction element with respect to the floating side friction element by virtue of differential connection arrangements, thereby meeting the differential springing requirements.

15 Claims, 3 Drawing Sheets

Figure 1:
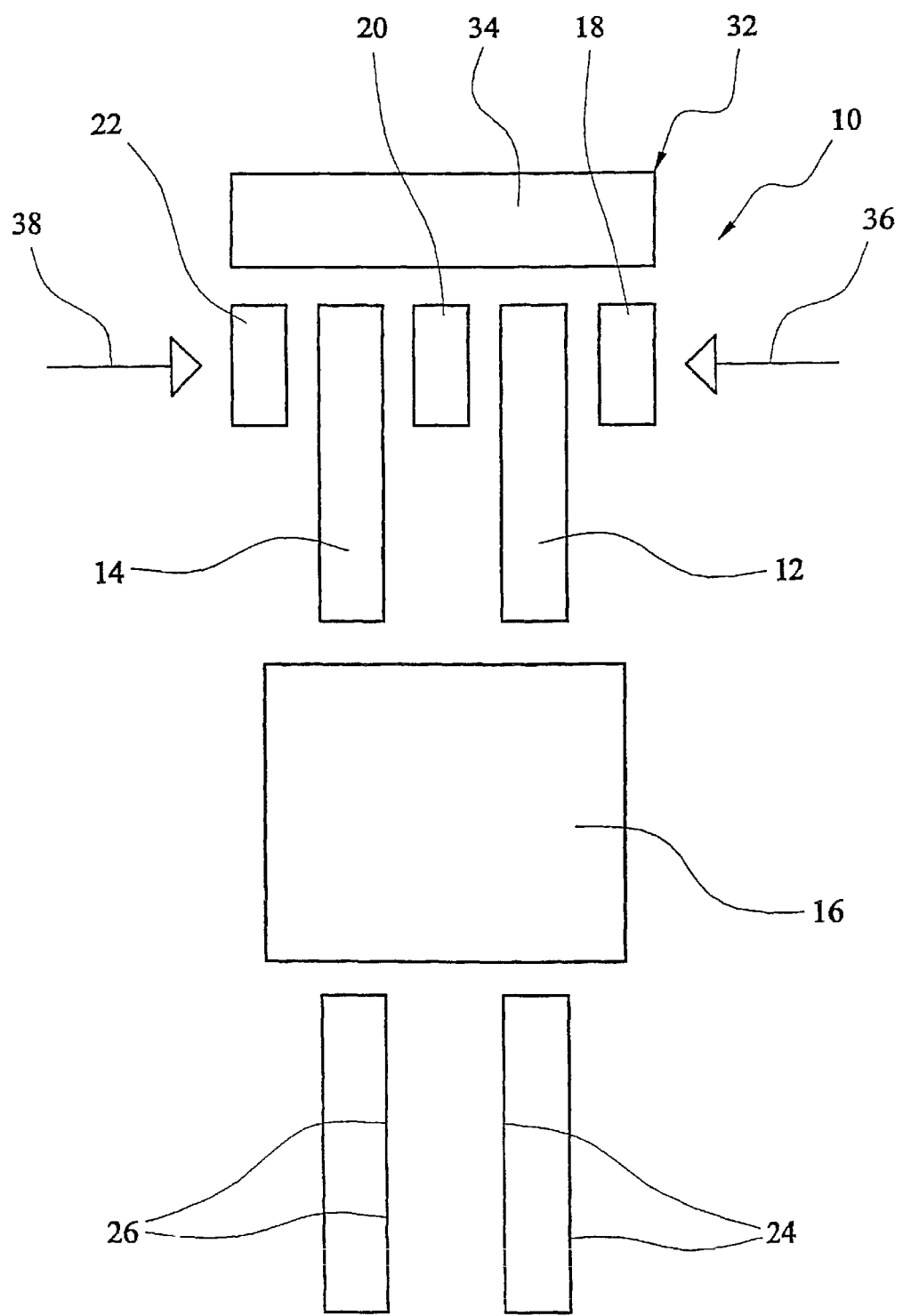

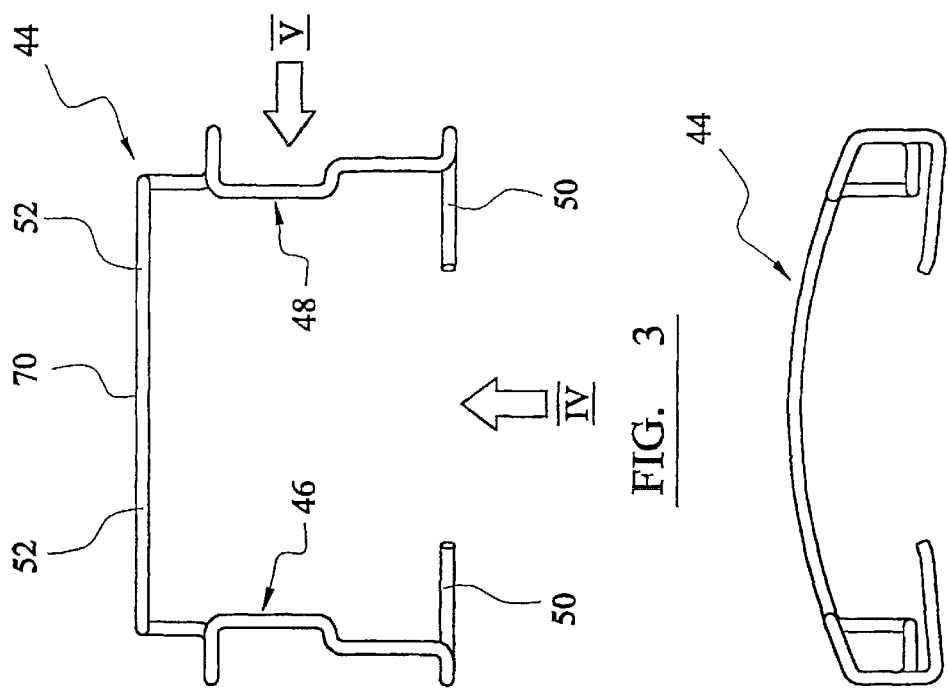
FIG. 3
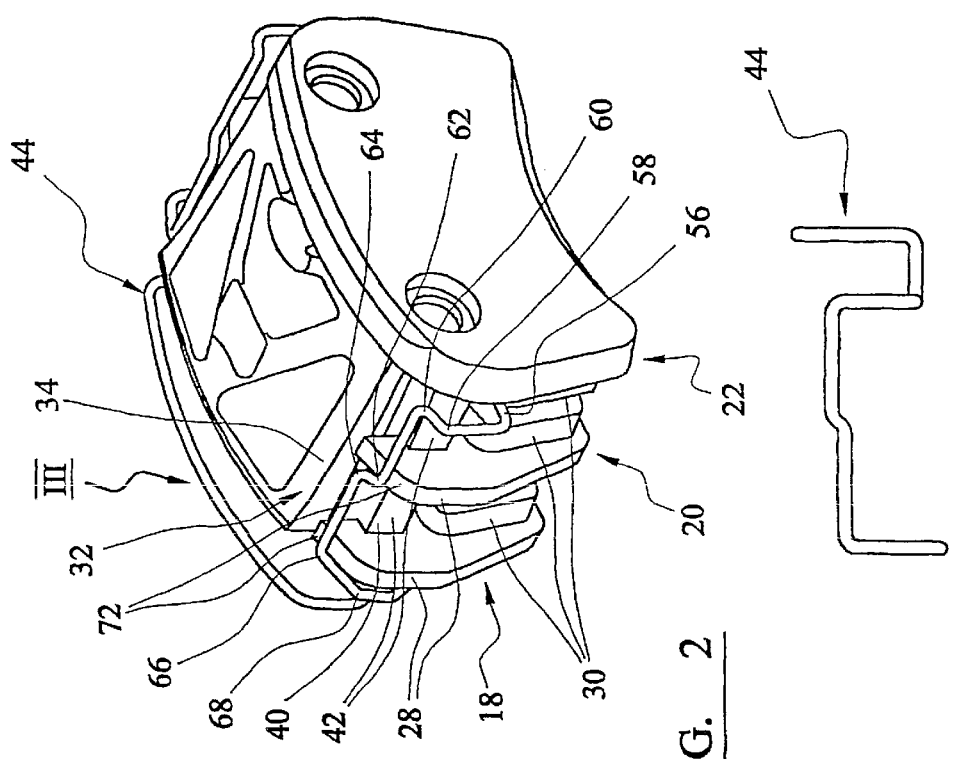
FIG. 4
FIG. 2
FIG. 5

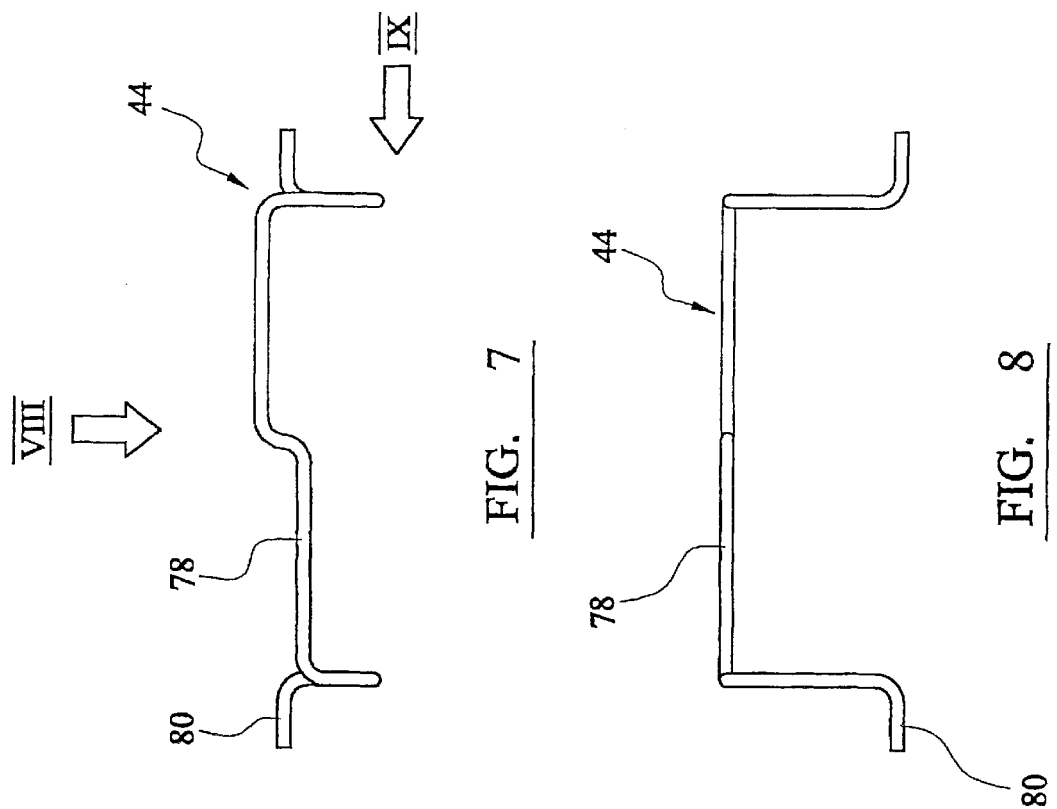
FIG. 7
FIG. 8
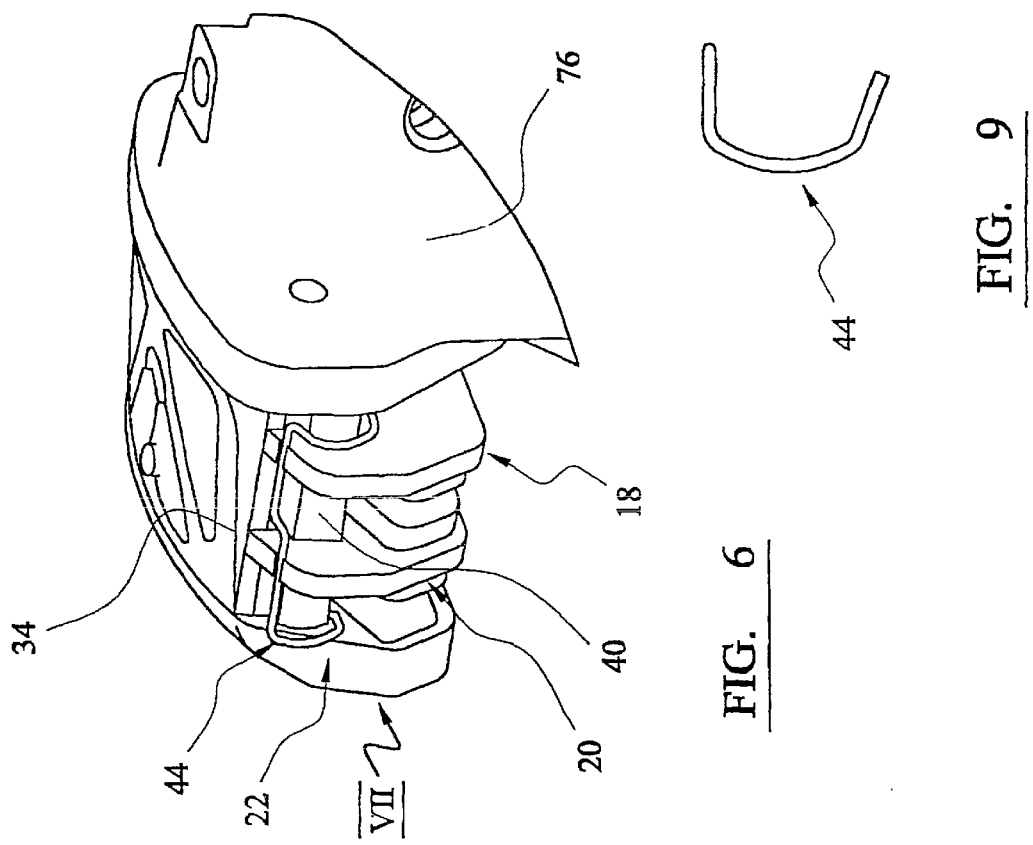
FIG. 6
FIG. 9

APPARATUS AND METHOD FOR MOUNTING FRICTION ELEMENTS IN DISC BRAKES

BACKGROUND OF THE INVENTION

1. Technical Field

This invention relates to a method and apparatus for mounting friction elements in disc brakes. A particular embodiment of the invention relates to the mounting of friction elements in a disc brake of the kind in which at least one brake disc is axially slideable with respect to its associated rotatable mounting and the friction elements which frictionally engage braking surfaces at opposite sides of the disc are slideably mounted on a fixed caliper or bridge structure which resists movement of the friction elements under the action of the frictional forces generated by engagement of same with the rotating brake disc during actuation of the brake. Certain aspects of the invention may find wider application than strictly in relation to a disc brake of the kind just enumerated.

2. Related Art

There is disclosed in WO 98/26192 and WO 98/25804 a disc brake of the kind described above in which resilient means is provided in relation to at least one axially slideable brake disc and in relation to at least one axially slideable friction element. The resilient means for the disc provides, inter alia, an anti-tilt mounting function. The resilient means for the friction element serves merely to prevent rattle.

In our above-identified prior published WO specifications, the arrangement adopted in relation to the friction elements for mounting the resilient means with respect to the fixed caliper or bridge structure has been on the basis of using the fixed and stable structure of the caliper or bridge as a mounting for providing the basis or foundation from which the resilient means takes its mounting for exerting the necessary forces on the friction elements. Such an arrangement has been considered a logical basis for the construction of an assembly in which there is a need for a high degree of structural and operational integrity achievable on the basis of, inter alia, simplicity of structure and assembly, and minimization of mechanical wear in use, and related factors.

In the embodiments of these prior proposals there has been adopted the use of a leaf-type spring acting from the caliper or bridge, and mounted thereon by means of fasteners, and a suitable connection to the friction elements accordingly.

One aspect of the construction of springing systems for the friction elements of spot-type disc brakes employing one or more axially floating discs, concerns the matching of the spring effect to the physical characteristics of the friction element concerned, notably the question of whether or not the friction element is double-sided (as occurs in the case of the central friction element between a pair of floating brake discs in a double-disc brake of this kind). There may be other circumstances in which it is desirable to vary the spring force applied to the friction element as between one such friction element between a pair of floating brake discs, the actual construction of the friction element (which affects its mass and inertia) differs from that of its associated single-sided friction elements on the outer side of each of the two brake discs. Likewise, it will be understood, that in addition to the static factors affecting such a friction element, so too the dynamic factors affecting it differ from those of its single-sided neighbors in that the double-sided frictional effects during actuation of the brake differ very substantially (from the single-sided effect) and lead to a requirement, we have discovered, for a differential springing effect as between the two types of friction elements accordingly.

While design or dynamic factors arising in a disc brake of the relevant kind may produce a requirement for a differential springing effect even in relation to a brake having a single sliding disc, as disclosed below and as is likely to be the case commercially, the more usual brake structure comprises at least two discs with a double-sided friction element slidingly mounted between the discs, and which is subjected to significantly different forces from those applied to its single-sided neighbor (on the piston-and-cylinder actuator side of the brake), and these differences lead to a requirement for the above-discussed differential springing effect.

Further related factors which have influenced the basis for the technical advance incorporated in the embodiments of the invention include the fact that our prior unpublished work in this field on the control of friction elements includes (as mentioned above) the use of leaf springs mounted on the fixed caliper of the disc brake and acting on all friction elements in an endeavor to provide the necessary spring effect in a simple structure. Such an arrangement can indeed be constructed to provide the required spring effect. However, improvements in several respects would be potentially capable of providing significant performance advantages in relation to such aspects as simplicity and cost of construction of the resilient means, simplicity of mounting (and the avoidance of the use of fasteners such as cap screws), avoidance of the entrapment of dirt and water, and the reduction of space requirements, with the related potential benefit in relation to vehicle turning circle as affected by the volume of movement described by the brake structure in vehicle turning movements (in relation to steered wheels). A further factor relates to ability to apply the spring effect at the location on the friction element where such is of best effect and preferably in a symmetrical manner, for example at both lateral sides of the friction element where it is mounted on guides for sliding movement towards and away from (at least in terms of relative movement) the associated disc friction surfaces.

SUMMARY OF THE INVENTION AND ADVANTAGES

The resilient means adopted in the embodiments of the present invention have a resilient effect and generate a corresponding spring force which is of a magnitude such that it is significantly greater than that which is required merely for elimination of rattle, and a distinction is therefore to be drawn between the resilient means of the embodiments of the present invention and previously proposed anti-rattle springs in brakes of various kinds. The spring forces generated in the embodiments of the present invention are at a level such that the friction elements are constrained (by the predetermined spring forces) from sliding on their guides, whereby not only is rattling or noise suppression achieved but also the friction elements are restrained from free sliding movement into contact with the brake discs in an uncontrolled manner.

In described embodiments of the invention, resilient means is provided by the two or more friction elements which are slideably mounted in a disc brake and the resilient means acts on both such friction elements so as to produce a differential resilient effect as between the two friction elements, whereby the resilient effect can be matched to the physical characteristics, including mountings, of the friction elements themselves.

In the described embodiments, the resilient means is adopted in a wire spring format which enables several significant advantages to be achieved, including simplicity of mounting (by means of cooperation between the wire of the spring and suitable drillings or bores or notches in the friction elements). Moreover the wire spring form conveniently enables the springs to incorporate various chosen profiles achieved by bending, whereby the location and geometry of the spring and its connection to the friction elements enables the required differential effect to be achieved. For example one simple way of effecting this is to arrange matters so that the moment of the forces exerted by the spring in relation to the friction element is varied in accordance with the required spring effect either by choosing the length of the moment arm accordingly and/or connecting the spring to the friction element appropriately.

Another aspect of the resilient means in the embodiment, which leads to practical advantages in relation to the general construction of the wire spring which provides the required resilient properties, is that a one-piece construction can be adopted which has a generally channel-shape profile as seen in its operating attitude in plan view and thus the wire spring is able to straddle the opposite sides of the caliper or bridge structure which supports the friction elements in their sliding movement. It will be understood that the adoption of a single wire spring construction enables the differing spring forces required by the friction elements to be applied at opposite ends of each of these. Moreover the spring construction has the inherent simplicity of a wire spring, and is coupled with the easy mounting of same as discussed above. Also the spring has the ability to extend between the spaced friction elements for actuation of each and the wire construction has an inherent tendency not to provide structures offering a trap for foreign matter and debris. In this way there has been provided a spring system for friction element mounting in brakes of the relevant kind which offers significant technical advances.

In the embodiments of the present invention the disc brake incorporates resilient means both in relation to the mounting of the brake discs on their mounting hub and in relation to the brake friction elements or pads in relation to their fixed mounting or caliper.

The resilient means are of a structure and strength chosen to be capable of, both in the case of the brake disc and in the case of the brake friction elements, maintaining these components of the brake assembly in their required working attitudes with respect to the structures on which they are mounted. In other words, the springs or resilient means for the brake discs are constructed so as to hold the brake discs in non-tilted working attitudes as they rotate. Likewise, the resilient means for the friction elements or pads maintain these latter structures in their required attitudes with respect to their fixed mounting or caliper. In both cases, the resilient nature of the resilient means permits under the dynamic conditions arising during use of the vehicle and due to engine vibration and vehicle motion/road surface induced vibration and similar factors, a degree of movement from the defined working position (as opposed to the linear axial sliding movement needed to effect friction element-to-disc engagement and disengagement when commencing and terminating braking) which is needed under normal conditions of vehicle use.

In this regard, it is to be noted that the resilient means or springs used in the embodiments in relation to the friction elements for maintaining same in their normal non-tilted attitudes, differ significantly from the springs disclosed in the above-identified WO 98/25804 and WO 98/26192 specifications in which the pad springs are mere anti-rattle springs not adapted to hold the brake pads against tilting movement, but merely to avoid rattling. Moreover, in the embodiments of the present invention the springs for the discs and for the pads are balanced in terms of their relative loading applied to the discs and the pads in order to achieve the necessary separation of same when braking is discontinued and yet holding the pads and discs against tilting during use. Thus, the spring forces exerted on the pads or friction elements of the present invention are much stronger than those merely to prevent rattling or noise suppression. The spring forces are sufficient to restrain the slideable brake pads or friction elements from moving into contact with the brake discs in an uncontrolled manner. The use of the substantially stronger pad springs in the present embodiment assists in positioning the outer rims of the brake discs in their brake-off position for reducing residual brake torque.

THE DRAWINGS

These and other features and advantages of the present invention will become more readily appreciated when considered in connection with the following detailed description and appended drawings, wherein:

FIG. 1 shows in block diagram format a spot-type automotive disc brake comprising a pair of axially slideable discs and associated friction elements, an actuating mechanism therefor and a fixed caliper or bridge structure overlying same;

FIGS. 2, 3, 4 and 5 show views of a first embodiment of the invention which is applicable to a disc brake of the kind shown in FIG. 1, FIG. 2 being a perspective view of the caliper assembly which includes a central friction element and two side or end friction elements, and FIGS. 3, 4 and 5 being views of the resilient means or spring, on its own, as seen generally in the directions indicated in FIGS. 2 and 3 by arrows III, IV and V respectively;

FIGS. 6, 7, 8 and 9 show a second embodiment of the invention which is likewise applicable to a disc brake of the kind shown in FIG. 1, FIG. 6 being a perspective view similar to that of FIG. 2 but showing a different form of spring and mounting which is adapted to act at one side only of the assembly of three friction elements, FIG. 7 being a side elevation view of the spring as seen in the direction of arrow VIII in FIG. 6, and on a somewhat larger scale; and FIGS. 8 and 9 being further views of the spring of FIG. 7, as viewed in the direction of arrows VIII in IX in FIG. 7.

DETAILED DESCRIPTION

As shown in FIG. 1 a spot-type automotive disc brake 10 comprises a pair of rotatable brake discs 12,14, a rotatable mounting 16 for the brake discs to permit rotation of the discs and which is adapted to drive the brake discs and have exerted thereon the braking effect by the discs when the disc brake 10 is actuated.

Two pairs of friction elements 18,20 and 20,22 are provided and are adapted to frictionally engage braking surfaces 24,26 provided at opposite sides of brake discs 12,14 to effect braking on actuating actuation means for the brake. Central friction element 20 is double-sided for frictional engagement with the mutually-inwardly facing braking surfaces 24,26 of brake discs 12,14 and is provided with appropriately facing friction pad material accordingly. Friction elements 18, 20 and 22 comprise (as shown in FIGS. 2 and 6) in each case a generally flat metal backing plate 28 and secured thereto and standing proud thereof a body of friction material 30 of known construction for high durability frictional engagement with the relevant braking surface of the relevant brake disc. In the case of central friction element 20, the friction material is provided at both faces of the backing plate 28.

Brake discs 12,14 are axially slideable in use with respect to their rotatable mounting 16 under the action of friction elements 18, 20, 22 and the actuation means (to be described below) therefor during braking. For example the brake discs may be keyed to the rotatable mounting or hub 16 at three or more locations and resilient means may act there between. We refer to the disclosure in our co-pending application numbers GB 0010810.0 and PCT/GB01/01958 (corresponding to co-pending U.S. application Ser. No. 10/019,919, filed contemporaneously herewith) and incorporate the relevant portion of the disclosure therein herein by reference accordingly.

A fixed non-rotatable mounting 32 for friction elements 18, 20 and 22 is provided comprising a caliper or bridge structure 34 which is mounted on a fixed structure of the vehicle to be braked, for example on the wheel mounting and which straddles the brake discs 12,14 and also provides a mounting for actuation means 36,38 (indicated diagrammatically) which applies inwardly directed braking forces to the outer friction elements 18,22, thereby causing frictional engagement with the brake discs 12,14 and slight sliding movement of those discs with respect to their rotatable mounting 16. In FIG. 1 of course it can be seen that the clearances between the structures have been greatly exaggerated for simplicity of diagrammatic illustration. The actuation means 36,38 could comprise a pair of piston and cylinder assemblies. However only one such is strictly needed since the actuation means can be one-sided with a fixed structure at one side or the other of the assembly of discs and friction elements (which fixed structure could simply be a stop extending from caliper 34), and against which fixed structure the assembly is pushed by the single actuation means.

Fixed and non-rotatable mounting 32 for the friction elements 18–22 is adapted permit sliding movement of the friction elements into and out of frictional engagement with the brake discs while resisting rotational movement of the friction elements under the action of frictional forces generated by engagement of the friction elements with the discs 12,14. As shown in FIGS. 2 and 6 the friction elements are slideably mounted on the caliper 34 by means of a pair of laterally-facing guide rails 40 provided one at each side of the caliper 34, and complementarily-shaped grooves formed in the friction element backing plates 28 whereby these latter are freely slidingly movable on the rails 40, with a minimum of clearance or backlash, having regard to acceptable manufacturing tolerances.

Resilient means 44 is provided in relation to the non-rotatable mounting 32 for the friction elements 18–22 and is adapted to act between the friction elements (at the opposite sides of the brake discs) and caliper 34 in order to minimize friction element movement in the brakes-off condition and/or noise and/or rattle with respect to the caliper or bridge 34 (and generally in a direction laterally with respect to the direction of inward movement of the friction element to engage the brake discs on commencing braking), as will be more fully described below.

Turning now the construction of resilient means 44, in the embodiment of FIGS. 2–5, this is adapted to act on all three friction elements 18, 20 and 22 and so as to exert a differential spring effect as between the central one 20 of these and the other two friction elements 18,22, by virtue of differential physical characteristics in the connection of the resilient means to the friction element 20 and to the friction elements 18,22 accordingly.

As will be explained below, resilient means 44 is constructed and arranged so as to exert its differential spring effect on the friction elements 18, 20 and 22 by being connected to these at different locations on the friction elements at which the resilient means generates different levels of force. Moreover the resilient means 44 is in the form of a wire spring which is caused to exert its differential spring effect by virtue of shaped portions of the wire spring in which the wire follows a non-linear profile, as more fully described below.

In this first embodiment of the invention, resilient means 44 extends generally axially with respect to the brake discs 12,14 in axial portions 46,48 of the resilient means (see FIG. 3) and has laterally-extending portions 50,52 at the ends of the axial portions, the latter of which extends across to and is joined integrally with the other such portion 52 so as to form with a U-shaped overall spring structure which cooperates with the friction elements 18, 20 and 22 at opposite (circumferentially-spaced with respect to the brake disc) sides of each friction element.

It will be understood that in this embodiment of a fixed caliper/floating disc-type disc brake the actuation of the brake is in fact effected from a piston and cylinder assembly (not shown) at one side only (say actuation means 36) so that friction element 22 is simply fixed to caliper 34 and does not require to slide with respect thereto. Thus, only central friction element 20 and floating friction element 18 require the action of resilient means 44.

Accordingly, turning now to the details of the construction and arrangement of resilient means 44 in FIGS. 2–5, it will be seen in FIG. 2 that the resilient means is constructed in the form shown in FIGS. 3, 4 and 5 of a wire spring.

As can be seen in FIG. 2, wire spring 44 engages the undersides of guide rails 40 of caliper 34 at the inner end of laterally extending portions 50 of the spring and extends via bends 56, 58, 60, 62, 64, 66 and 68 to the transverse proportion 70 which is an integral link between the laterally-extending portions 52.

Wire spring 44 acts on sliding friction elements 18,20 at notches 72,74, between which the wire is jogged whereby the spring force within spring 44 is applied to the friction elements at different locations thereon (with respect to guide rails 40), and indeed at different portions of the spring which have differing geometry with respect to the overall spring structure and thus themselves give rise to a differential spring effect.

In the embodiment of FIGS. 6–9, the general construction of the caliper assembly is similar to that of the preceding embodiment. In FIG. 6, the direction of viewing is different from that of FIG. 2, the caliper assembly being viewed from the actuation side, looking towards the fixed friction element 22, item 76 being a housing for the hydraulic actuator assembly. In this embodiment, instead of providing a single spring assembly joined by transverse portion 70 as in the embodiment of FIGS. 2–5, a pair of springs 78 are provided one associated with each of the guide rails 40 and which are located by an end spigot 80 which locates in a bore in fixed friction element 22, the other end of each spring 78 engaging the underside of guide rails 40, as in the preceding embodiment, and the spring engaging in notches 72,74 formed in the friction elements in a manner similar to that of the preceding embodiment.

It will be noted that in both of the above embodiments, the resilient means 44 are constructed to be able to accommodate the limited axial sliding movement of the friction elements with respect to the caliper 34 in use by means of sliding movement of the friction elements with respect to linear portions of the wire spring elements.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of operating a disc brake system, comprising:
providing at least one brake disc having braking surfaces on opposite sides of the at least one brake disc;
supporting the at least one brake disc on a rotatable mounting such that the at least one brake disc is rotatable with the rotatable mounting and slideable axially relative to the rotatable mounting during operation of the disc brake system;
arranging at least one pair of friction elements on the opposite sides of the at least one brake disc operative when actuated to axially displace the at least one braking disc during operation of the disc brake system and frictionally engage the braking surfaces of the at least one brake disc to effect braking action of the at least one disc and the rotatable mounting;
slidably supporting the friction elements on a non-rotatable mounting to permit sliding movement of the friction elements into and out of engagement with the braking surfaces during operation of the disc brake system while resisting movement under the action of frictional forces generated by engagement of the friction elements with the at least one brake disc; and
providing a resilient device acting on both of the friction elements on opposite sides of the brake disc during operation of the disc brake system but with a differential spring effect such that one of the friction elements is biased by a spring force that is different than that biasing the other friction element.

2. The method of claim 1 wherein the resilient device acts at a different locations on the friction elements to achieve the differential spring effect.

3. The method of claim 1 wherein the resilient device is caused to contact the friction elements at different respective spacings relative to the non-rotatable mounting to achieve the differential spring effect.

4. The method of claim 1 including providing a wire spring as the spring device having non-linear shaped portions which act on the friction elements at locations to achieve the differential spring effect.

5. The method of claim 1 including providing a wire spring as the spring device formed with a generally U-shaped form including a pair of axial portions extending across and engaging the friction elements on opposite sides of the non-rotatable mounting and joined by an integral transverse portion extending between the axial portions and including ends of the wire spring engaging the non-rotatable mounting.

6. An automotive disc brake system comprising:
a rotatable mounting;
at least one brake disc supported on said rotatable mounting for rotation therewith and moveable axially therealong during operation of the disc brake system, said at least one brake disc having opposite sides and braking surfaces on said opposite sides;
a non-rotatable mounting;
at least one pair of friction elements slideably supported on said non-rotatable mounting for relative sliding movement into and out of frictional engagement with the braking surfaces of the at least one brake disc and operative when activated to displace the at least one brake disc axially along said rotatable mounting and with said at least one pair of friction elements resisting such sliding movement under the action of frictional forces generated by engagement of the friction elements with the braking surfaces; and
a resilient device acting on both of the friction elements on opposite sides of the brake disc but with a differential spring effect such that one of the friction elements is biased by a spring force that is different than that biasing the other friction element to achieve a differential spring effect as between said friction elements.

7. The system of claim 6 wherein the resilient device acts at a different locations on said friction elements to achieve said differential spring effect.

8. The system of claim 6 wherein the resilient device is contacts the friction elements at different respective spacings relative to the non-rotatable mounting to achieve the differential spring effect.

9. The system of claim 6 wherein said spring device comprises a wire spring having non-linear shaped portions which act on said friction elements at locations to achieve said differential spring effect.

10. The system of claim 6 wherein said spring device comprises a wire spring formed with a generally U-shaped form including a pair of axial portions extending across and engaging said friction elements on opposite sides of said non-rotatable mounting and joined by an integral transverse portion extending between said axial portions and including ends of said wire spring engaging said non-rotatable mounting.

11. A disc brake system comprising: a brake disc which is axially slideable during operation of the disc brake system; a pair of friction elements supported for sliding movement on a non-rotatable mounting which are operative when actuated for sliding into and out of braking engagement with said axially slideable brake discs to effect axial displacement of said brake disc; and a resilient device acting on both of the friction elements on opposite sides of the brake disc but with a differential spring effect such that one of the friction elements is biased by a spring force that is different than that biasing the other friction element to achieve a differential spring effect as between said friction elements.

12. The system of claim 11 wherein the resilient device acts at a different locations on said friction elements to achieve said differential spring effect.

13. The system of claim 11 wherein the resilient device is contacts the friction elements at different respective spacings relative to the non-rotatable mounting to achieve the differential spring effect.

14. The system of claim 11 wherein said spring device comprises a wire spring having non-linear shaped portions which act on said friction elements at locations to achieve said differential spring effect.

15. The system of claim 11 wherein said spring device comprises a wire spring formed with a generally U-shaped form including a pair of axial portions extending across and engaging said friction elements on opposite sides of said non-rotatable mounting and joined by an integral transverse portion extending between said axial portions and including ends of said wire spring engaging said non-rotatable mounting.

* * * * *